United States Patent [19]

Johnson

[11] Patent Number: 5,164,200
[45] Date of Patent: Nov. 17, 1992

[54] NOZZLE FOR GAS ASSISTED INJECTION MOLDING

[75] Inventor: Tom W. Johnson, Hunting Valley, Ohio

[73] Assignee: Nitrojection Corporation, Middlefield, Ohio

[21] Appl. No.: 716,778

[22] Filed: Jun. 18, 1991

[51] Int. Cl.⁵ .............................................. B29C 45/23
[52] U.S. Cl. .................................. 425/130; 264/572; 425/562; 425/564
[58] Field of Search ................ 264/572; 425/562, 563, 425/564, 565, 566, 130, 573

[56] References Cited

U.S. PATENT DOCUMENTS

| | | | |
|---|---|---|---|
| 2,940,123 | 6/1960 | Beck et al. | 425/564 |
| 4,033,710 | 7/1977 | Hanning | 425/543 |
| 4,082,226 | 4/1978 | Appleman et al. | 425/564 |
| 4,106,887 | 8/1978 | Yasuike et al. | 425/549 |
| 4,140,672 | 2/1979 | Kataoka | 425/817 R |
| 4,555,225 | 11/1985 | Hendry | 425/4 R |
| 4,657,496 | 4/1987 | Ozeki et al. | 425/130 |
| 4,781,554 | 11/1988 | Hendry | 264/572 |
| 4,905,901 | 3/1990 | Johnson | 264/328.7 |
| 5,030,076 | 7/1991 | Ebenhofer et al. | 425/564 |

OTHER PUBLICATIONS

The Best of Two Worlds in Plastic Processing, *Machine Design Magazine*, Dec. 9, 1982, by Donald R. Dreger, Staff Editor.

*Primary Examiner*—Tim Heitbrink
*Attorney, Agent, or Firm*—Fay, Sharpe, Beall, Fagan, Minnich & McKee

[57] ABSTRACT

A nozzle for the injection of a viscous fluid, such as a thermoplastic and a non-viscous fluid such as a gas into a mold cavity of a mold body includes a valve element mounted for reciprocation in a nozzle body flow passage to control a flow of viscous fluid through the nozzle body discharge end and into a mold cavity. The valve element includes a barrel having a first end selectively engaging a portion of the nozzle body discharge end to prevent a flow of viscous fluid therepast and a second end. A bore extends longitudinally through the barrel and a pin is positioned in the barrel bore. The pin has a first end located adjacent the barrel first end and a second end which is secured to the valve element such that the pin moves with the barrel as it reciprocates in the nozzle body. A non-viscous fluid flow passage is defined between the pin and the barrel.

20 Claims, 4 Drawing Sheets

NOZZLE FOR GAS ASSISTED INJECTION MOLDING

BACKGROUND OF THE INVENTION

This invention generally pertains to nozzles for injection molding. More specifically, the present invention relates to a nozzle for injection molding of plastic materials, which nozzle utilizes fluid assist.

The invention is particularly applicable to a gas assisted injection molding nozzle which enables a viscous fluid, such as a molten plastic, to selectively flow into a mold cavity and also enables the selective flow of a non-viscous fluid, such as a gas, into the mold cavity. However, it will be appreciated by those skilled in the art that the invention has broader applications and may also be adapted for use in many other injection molding environments where both a relatively viscous fluid, such as a plastic or wax, and a relatively non-viscous fluid, such as a gas or liquid, are injected into a mold cavity.

Recently, gas assisted injection molding has gained popularity. In this process, the mold cavity is filled with a plasticized thermoplastic material, usually to a volume less than 100% of the mold cavity, and an inert gas is injected under pressure into the plasticized material to fill the rest of the volume in the mold cavity. The gas is injected into the center of the flow of plastic but does not mix with the melt and instead runs along specially designed channels. In this way, with a suitably designed part, a continuous network of hollowed out sections can be provided. The material displaced by the gas from the middle of the sections moves out to fill the remainder of the mold space.

This network of gas channels provides a uniform pressure distribution system throughout the mold space during part rehardening and cool down thus minimizing internal stresses in the part. Gas injection provides a solution to a number of problems that have long plagued the injection molding industry. These include reduction of stress and warpage of the plastic part, elimination of sink marks and the provision of smooth surfaces on the injection molded part. In addition, clamp tonnage requirements can be reduced in comparison to conventional injection molding processes. The process also permits different wall thicknesses for a single part and faster cycle times in comparison with the conventional injection molding processes. Also, gas assisted injection molding reduces the need for external flow runners.

Several types of nozzles are known for gas assisted injection molding. However, many of these nozzles do not vent the gas back through the nozzle when the discharge of the gas is required. Even those nozzles which do vent the gas back through the nozzle are unsatisfactory because the molten plastic remaining in the nozzle or in the sprue and runner system is frequently vented back along with the gas thus causing one of the major difficulties with gas assisted injection molding, namely the plugging of gas channels in the nozzle with thermoplastic which solidifies and blocks off further gas flow through these channels. In addition, the gas piping and valves downstream from the nozzle can become plugged. The nozzle then becomes unusable until it is cleaned out which is a time consuming, difficult and expensive process.

A recently perfected nozzle does away with many of these disadvantages through the use of a pin which remains stationary as a barrel of the nozzle reciprocates around the pin. However, this type of apparatus requires the use of seal means to prevent the flow of gas through the barrel in a direction away from the mold cavity. As the barrel reciprocates in relation to the stationary pin, the seal means quickly becomes worn and begins to leak thus requiring a disassembly of the nozzle to allow a replacement of the seal means. The type of pin employed in the known device is also rather long and may be prone to breakage if there is a malfunction of the barrel reciprocating mechanism.

Accordingly, it has been considered desirable to develop a new and improved gas assisted injection molding nozzle which would overcome the foregoing difficulties and others while providing better and more advantageous overall results.

BRIEF SUMMARY OF THE INVENTION

According to the present invention an apparatus for injecting a viscous fluid, such as a thermoplastic, and a non-viscous fluid, such as a gas, into a mold cavity of a mold body is provided.

More particularly, in accordance with the apparatus, a nozzle body comprises an inlet end and a discharge end and a flow passage for viscous fluid extends from the inlet end to the discharge end. A valve element is mounted for reciprocation in a nozzle body flow passage to control a flow of viscous fluid through the nozzle body discharge end. The valve element comprises a barrel having a first end selectively engaging a portion of the nozzle body discharge end to prevent a flow of viscous fluid therepast and a second end. A bore extends longitudinally through the barrel. A pin is located in the barrel bore. The pin has a first end and a second end which is secured to the valve element such that the pin moves together with the barrel as the barrel reciprocates in the nozzle body. A first non-viscous fluid flow passage is defined between the pin and the barrel.

The apparatus further comprises a means for reciprocating the barrel in the nozzle body flow passage. The means can include a cross link member which preferably has a second non-viscous fluid flow passage provided therein for communicating with the first non-viscous fluid flow passage. The pin can be secured to the cross link member.

If desired, the pin can be in the shape of a right cylinder so as to provide an annular flow path of substantially constant diameter although many other pin configurations are also possible. Preferably, the tip of the pin is approximately even with the tip of the barrel.

One advantage of the present invention is the provision of a new and improved fluid assisted injection molding nozzle.

Another advantage of the present invention is the provision of a fluid assisted injection molding nozzle which allows the flow of the viscous fluid, such as a molten plastic, into a mold cavity and the flow of a non-viscous fluid, such as a gas, into the mold cavity and allows a venting of the non-viscous fluid out of the mold cavity.

Still another advantage of the present invention is the provision of a fluid assisted injection molding nozzle which is not as prone to plugging as are conventional nozzles of this type.

Yet another advantage of the present invention is the provision of a fluid assisted injection molding nozzle in which a flow path extends between the pin and a barrel in which the pin is secured. The flow path can be annular in shape and the pin can be in the form of a right cylinder so as to define an annular flow path of constant diameter. However, the pin could also have many other configurations so as to define other types of flow paths.

A further advantage of the present invention is the provision of a gas assisted injection molding nozzle having a movable valve element including a barrel. A pin is secured to the valve element and extends through an aperture in the barrel. In this nozzle, the pin reciprocates together with the barrel. This construction eliminates the necessity for any seal elements between the pin and the valve element thereby simplifying both the construction and maintenance of the nozzle in relation to the known nozzles.

A still further advantage of the present invention is the provision of a gas assisted injection molding nozzle having a barrel secured to a cross link member and having a pin extending through an aperture in the barrel and also secured to the cross link member. This construction eliminates the necessity of securing the pin to the valve body thereby shortening the length of the pin, saving material, and making the pin less prone to breakage.

Still other benefits and advantages of the invention will become apparent to those skilled in the art upon a reading and understanding of the following detailed specification.

BRIEF DESCRIPTION OF THE DRAWINGS

The invention may take form in certain structures preferred and alternate embodiments of which will be described in detail in this specification and illustrated in the accompanying drawings.

IN THE DRAWINGS

Figure 1:
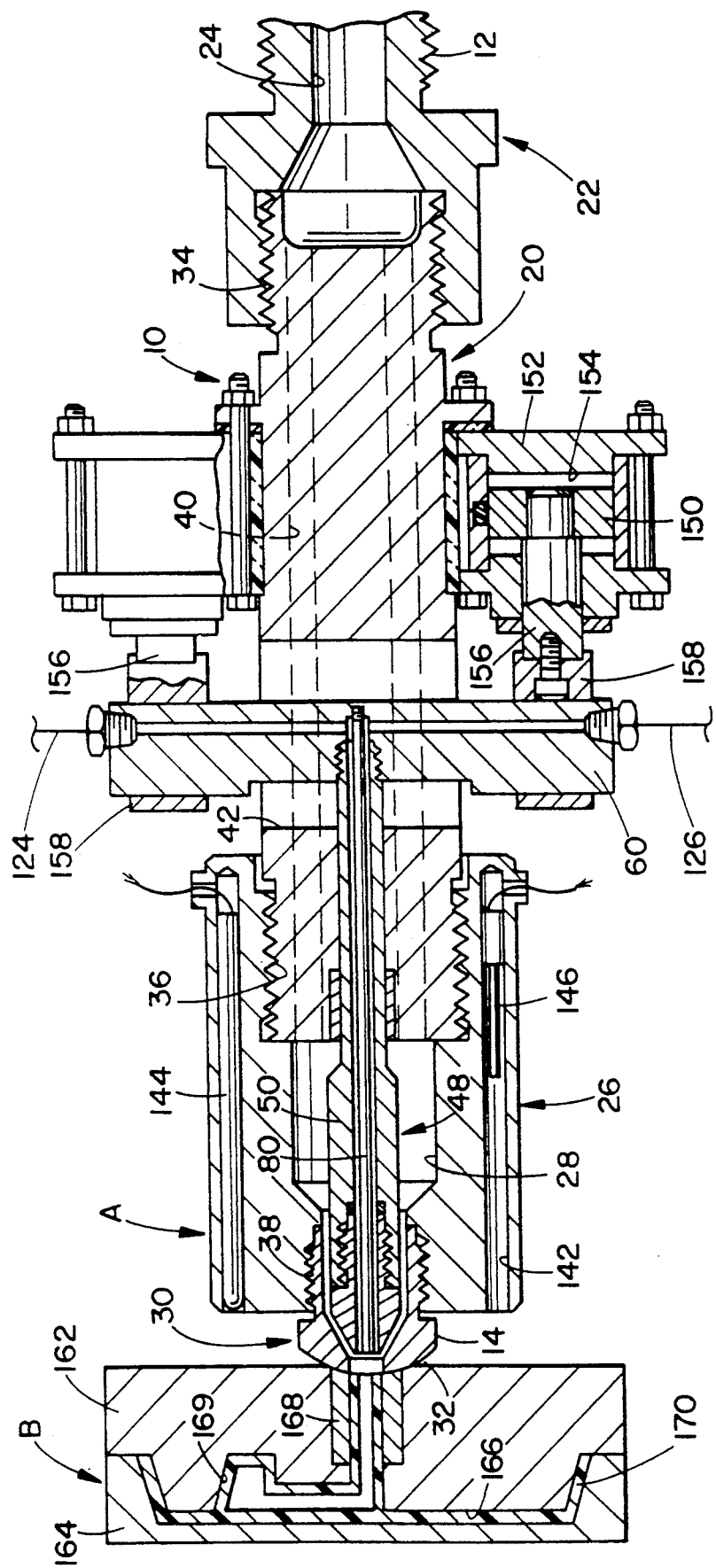
Figure 2:
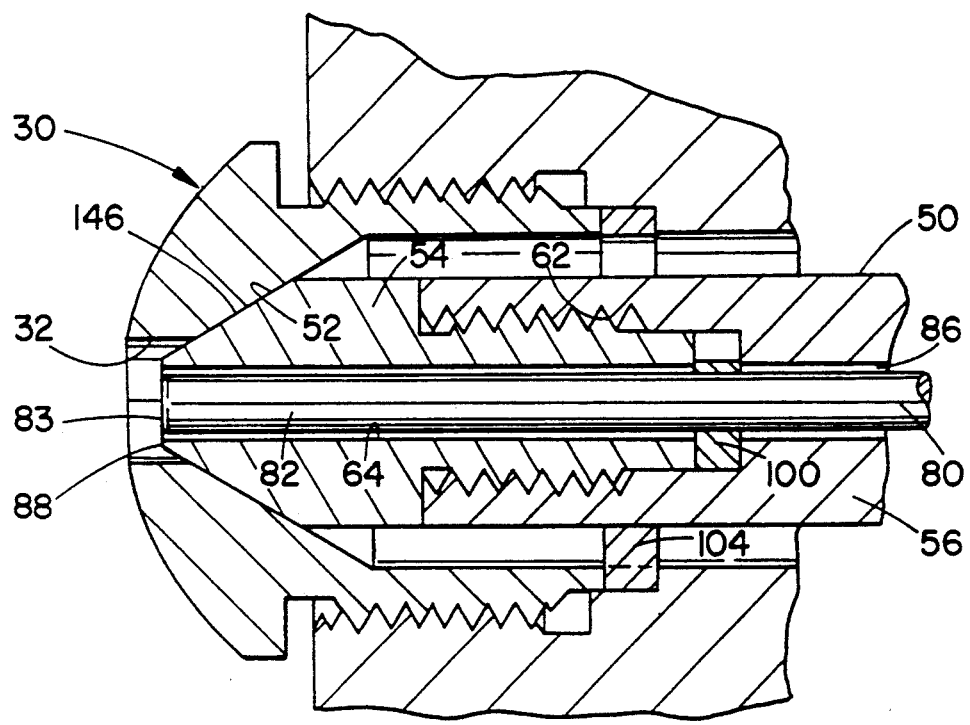
Figure 3:
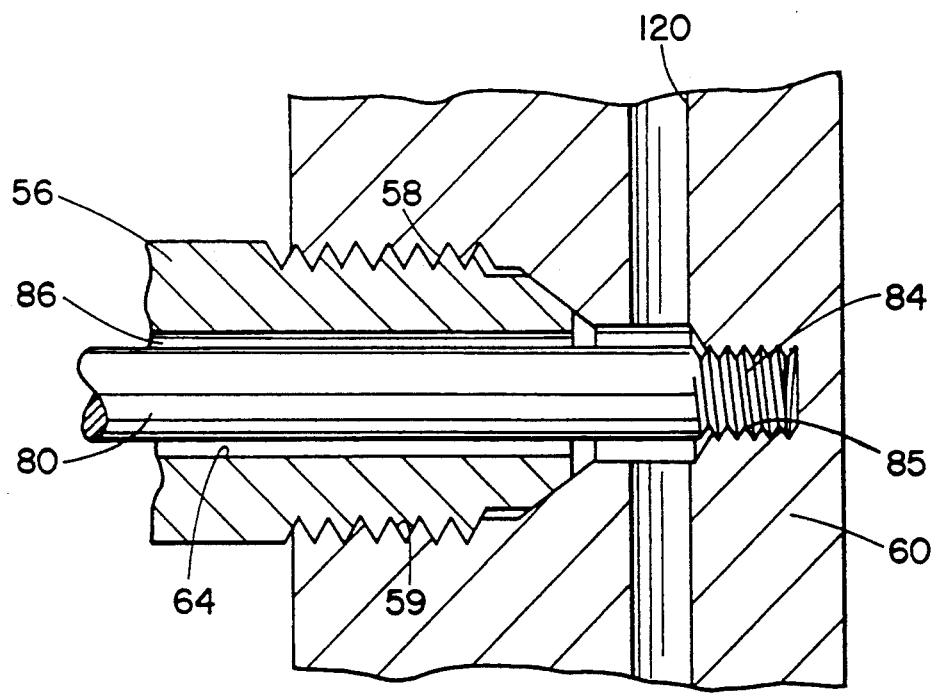
Figure 5A:
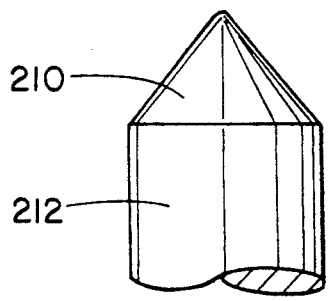
Figure 5B:
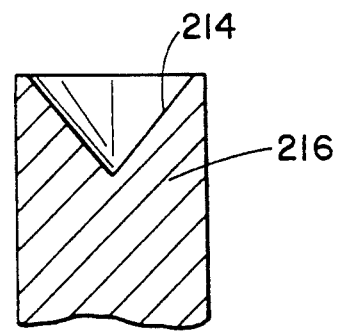
Figure 6:
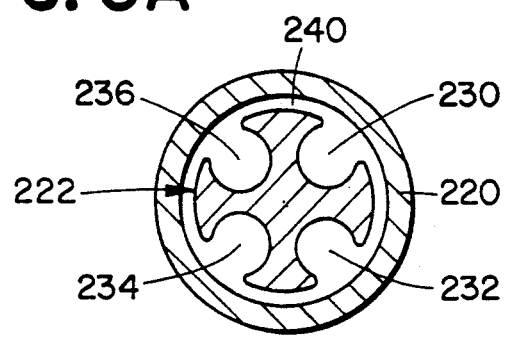
Figure 7:
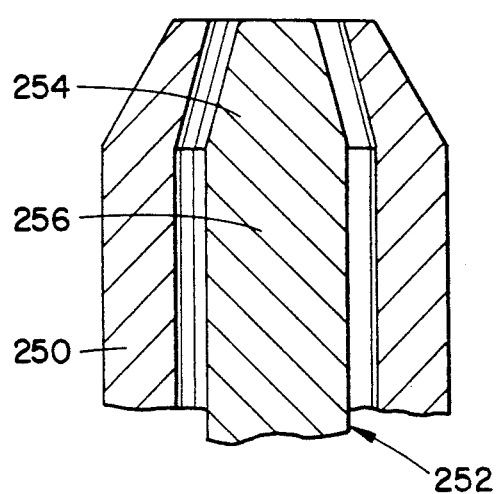
Figure 8:
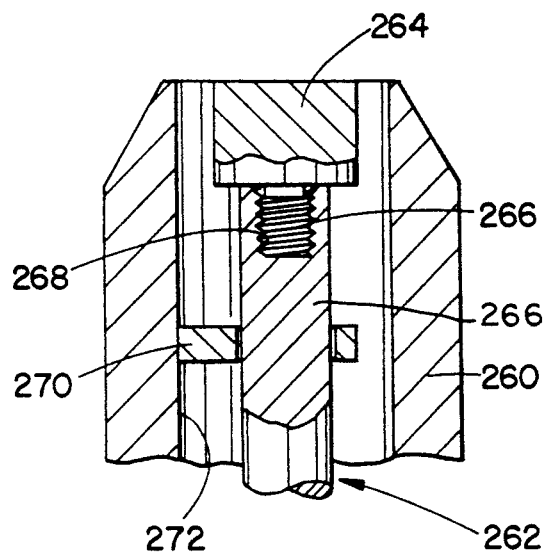
Figure 9:
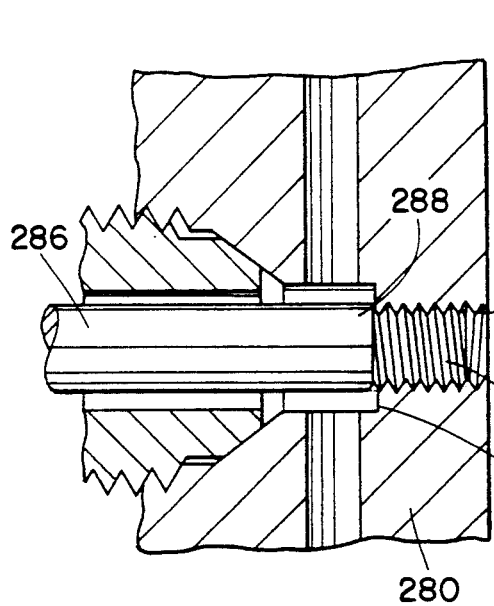
Figure 10:
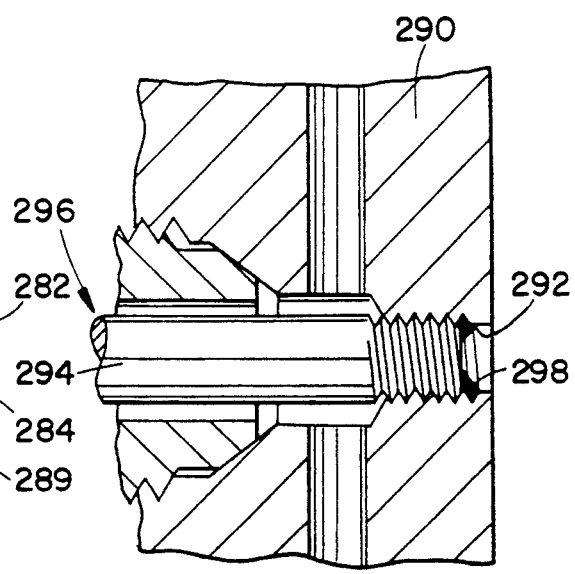

FIG. 1 is a side elevational view in cross section of a gas assisted injection molding apparatus together with a mold according to the preferred embodiment of the present invention;

FIG. 2 is a greatly enlarged cross sectional view of a portion of the apparatus of FIG. 1 with a reciprocating barrel being in a closed position;

FIG. 3 is a greatly enlarged cross sectional view of another portion of the apparatus of FIG. 1;

FIGS. 4A-D are cross-sectional views through barrels illustrating alternative pin configurations;

FIGS. 5A and 5B are enlarged side elevational views illustrating different pin end configurations;

FIG. 6 is an enlarged cross-sectional view illustrating yet another pin configuration;

FIG. 7 is an enlarged side elevational view in cross section of a barrel and pin end illustrating still another pin configuration;

FIG. 8 is an enlarged side elevational view in cross section illustrating a still further pin configuration;

FIG. 9 is an enlarged cross-sectional view of an alternative version of a means for securing a pin end in a cross bar; and FIG. 10 is an enlarged cross-sectional view illustrating a further pin end securing means.

DETAILED DESCRIPTION OF THE PREFERRED AND ALTERNATE EMBODIMENTS

Referring now to the drawings, wherein the showings are for purposes of illustrating preferred and alternate embodiments of the invention only and not for purposes of limiting same, FIG. 1 shows a fluid assisted injection molding apparatus which includes the subject new nozzle A located adjacent a mold body B. While the nozzle is primarily designed for and will hereinafter be described in connection with an apparatus used for the gas assisted injection molding of molten thermoplastics, it should be appreciated that the nozzle could also be used in various other molding environments in which a relatively viscous fluid and a relatively non-viscous fluid are injected, such as for the production of lost wax masters and the like.

The nozzle comprises a nozzle body 10 having an inlet end 12 and a discharge end 14. The nozzle includes a housing having a central section 20 and an adaptor or rear section 22 having a longitudinal bore 24 extending therethrough. Also provided is a barrel housing 26 having a longitudinal bore 28 extending therethrough and a tip 30 which similarly has a longitudinal bore 32 extending therethrough. The adaptor 22 is suitably secured to the central section 20 by interengaging threads as at 34. Similarly, interengaging threads as at 36 secure the barrel housing 26 to the central section 20. Securing the tip 30 to the barrel housing 26 are suitable threads as at 38.

The central section 20 has a first aperture 40 extending longitudinally therethrough in an orientation which is coaxial with the bores 24, 28 and 32 of the adaptor, barrel housing and tip respectively. Preferably two kidney shaped apertures 40 are provided in the central section 20, as is known. This allows for the formation of a flow channel entirely through the nozzle A. A second aperture 42 extends through opposing side walls of the central section 20 in a direction normal to the first aperture 40 and not in communication therewith. A valve body 48 is adapted to reciprocate in the nozzle body 10. For this purpose, a spreader or barrel 50 of the valve body is reciprocatingly mounted in the bore 28 of the barrel housing 26.

With reference now also to FIG. 2, the barrel 50 has a tapered first end 52 located on a front section 54 thereof, as well as a rear section 56 having a threaded end portion as at 58 (FIG. 3). The end portion 58 allows the barrel 50 to be secured in a threaded bore 59 of a cross bar or cross link member 60 which extends through the central section second aperture 42. A threaded area 62 may be utilized to secure the front and rear barrel sections 54 and 56 to each other. Extending longitudinally through the front and rear sections 54 and 56 is a bore 64. A longitudinally extending path is thus defined through the barrel 50 by the bore 64.

Extending through the bore 64 is a suitably shaped pin 80 which has an external diameter of suitable size so that the pin does not interfere with the barrel 50. In other words, an external diameter of the pin 80 is smaller than an internal diameter of the barrel bore 64. The pin 80 has a front end 82 which is located adjacent the barrel first end 52. The front end 82 has a front face 83. As shown in FIG. 3, the pin also has a suitably threaded rear end as at 84 so that the pin can be threaded into a suitable threaded aperture 85 provided in the cross link member 60. Because the pin 80 is threaded into the cross link member 60, its front tip 83 can be correctly located in relation to a barrel tip 88. Preferably, the pin front face 83 is even with the barrel tip 88 but the pin tip could also be somewhat ahead of or behind the barrel tip. To prevent gas leakage between the threads 84 and 85, the bore in the cross bar can be a blind bore as shown in FIG. 3. However, other ways of providing leak-tight joints are also conceivable. Of course, it should be appreciated that other ways of securing the pin 80 in place so that it moves or reciprocates with the barrel are also possible.

Gas flow between the pin and the barrel will take place through a gas flow passage 86 which is defined between them, as is seen best in FIGS. 2 and 3. The gas flow passage is annular or sleeve-like around the pin 80. Since the pin 80 is secured to the cross link member 60, the pin reciprocates with the barrel 50 so that the pin tip 82 is always located adjacent the tip 88 of the barrel front end 52. Preferably, the pin 80 is in the shape of a right cylinder which has a substantially constant diameter, although other shapes for the pin are also possible.

It is believed that the tip of the pin 80, i.e. the flat front face 83 thereof, should be located approximately even with the tip of the barrel 50. It is believed that with this type of construction, the molten thermoplastic will not have a tendency to cool in the area at the tip of the pin and thereby cause a cold slug at that point. In addition, it is believed that locating the pin tip 83 adjacent to, and preferably even with, the tip of the barrel will eliminate a tendency for the plastic to hang up in a gap which would be formed between the pin tip and the barrel tip if the pin tip were located behind the barrel tip.

Located in the bore 62 is a spider 100 which supports the pin 80 so as to prevent its wobbling or movement in a direction transverse to the reciprocating motion of the barrel 50. A suitable spider 104, located in the bore 28, can support the barrel front end if desired. Again, this would be for the purpose of preventing the barrel front end from moving in a direction transverse to its reciprocating motion.

With reference now to FIG. 3, the gas passage 86 is defined between the barrel 50 and the pin 80 and communicates with an aperture 120 which extends longitudinally in the cross bar or a cross link member 60 which is secured to the barrel 50 by the suitable threading 58. As shown in FIG. 1, the aperture 120 communicates at each end of the cross bar 122 with a respective suitable fluid line 124 and 126.

If desired, one or more longitudinally extending bores 142 can be provided in the barrel housing 26 to accommodate a conventional cartridge heater 144 or a conventional thermocouple 146.

The nozzle preferably further comprises a means for selectively urging the valve body 48 in a first direction so as to close the nozzle body discharge end 14 by abutting the side face 52 of the barrel 50 against an angled portion 146 of the tip 30, (see FIG. 2) and in a second direction to open the discharge end. The means for selectively urging is secured to the nozzle body central section 20 and preferably comprises a toroidally shaped piston 150 that is held in a housing 152 which defines a chamber or a cavity 154 in which the piston reciprocates as controlled by a pressurized fluid delivered selectively to one of the faces of the piston. Secured to a front surface of the piston are a pair of piston rods 156 which are connected at their free ends to a pair of holders 158. The holders, in turn, are so shaped as to hold the cross bar 60 and thus enable the valve body 48, including the barrel 50, to be reciprocated.

The tip 30 adjoins the mold body B which includes a first mold half 162 and a second mold half 164. The mold halves define between them a mold cavity 166. Preferably, a sprue body 168 is located in the mold first half 162 and enables the tip 30 to communicate with the mold cavity 166.

In use, an amount of thermoplastic sufficient for the preparation of the injection molded product, and normally less than the volume of the mold cavity 166, is injected through bores 24, 40, 28 and 32, through the sprue body 168 and into the mold cavity 166, as allowed by the barrel 50. Either simultaneously therewith or thereafter a quantity of a suitable non-viscous fluid, such as a gas, is introduced into the fluid line 122 in the cross link member 60 and flows into the annular fluid flow passage 86 and from there through the sprue body 168 into the mold cavity. The fluid, which is preferably a neutral gas such as nitrogen, forms a fluid cavity 169, or one or more fluid flow channels, in the molten thermoplastic material 170 held in the mold cavity 166 and pushes the molten thermoplastic material out against the walls of the mold cavity. The thermoplastic material is thereupon allowed to cool until it is capable of retaining the shape imposed on it by the mold cavity. Subsequently, the fluid is vented from the fluid cavity 169 created in the thermoplastic material back through passage 86 and fluid line 122.

As stated previously, one of the major problems with gas assisted injection molding is that, during venting, still molten plastic is sucked back into the gas flow passages blocking such passages and preventing any further gas flow through them. One advantage of the construction illustrated in FIGS. 1–3 is that only an annular fluid flow path 86 is provided around the pin 80 instead of a central flow path. This annular path 86 will limit the entry during venting of any molten thermoplastic in the form of strings or particles. Any thermoplastic remaining molten at the start of the venting process is located at the gas-plastic interface at the wall of the gas cavity 169. Thus the molten plastic is relatively centrally located and will flow (in the form of one or more molten plastic strings, it is believed) through the sprue body 168, the tip bore 32 and reach the pin 80. A turbulent gas flow, which it is believed is caused by the cooperation of the barrel 50 and pin 80 so as to provide the annular flow path 86 (and no central flow path) around the periphery of the pin, will throw the plastic outwardly, outside the path 86 and into bore 32. As presently understood, the plastic strings and particles will then cool down into a plastic film coating which adheres to the outer periphery of the tip bore 32.

It is noted that the bore 62 closely encircles the pin front end 82. Preferably the pin has a diameter of 0.125 inches (0.318 cm.) whereas the barrel bore 62 has an inner diameter of 0.1406 inches (0.357 cm.). Accordingly, the gap between these two is 0.0156 inches (0.00396 cm.). While this gap is minuscule, a suitable volume of gas is able to flow through this space due to the sleeve-like or annular nature of the flow path. Due to the annular shape of the flow path, there is enough area provided by the flow path to enable the gas to flow in and out of the mold cavity 166. The area is $\pi \times 0.0703^2 - \pi \times 0.0625^2 = 0.0155257 - 0.0122716 = 0.0032541$ square inches (0.020994 cm.$^2$).

Figure 4A:
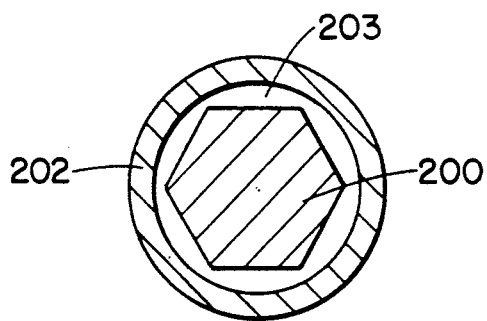
Figure 4B:
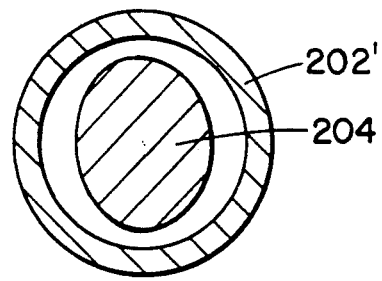

FIGS. 4A through 4D illustrate alternate configurations for the pin which extends through the barrel. In FIG. 4A, a hexagonal pin 200 extends through a barrel 202. An annular flow path 203 defined between the hexagonal pin 200 and the barrel 202 allows for the flow of gas or other suitable fluid between the pin and the barrel. The pin 200 can be of a substantially constant diameter along its length if so desired. In FIG. 4B an oval pin 204 extends through a barrel 202'. The use of hexagonal or oval pins may be advantageous under certain circumstances. It is evident that the annular flow paths defined between the pins 200 and 204 and the respective barrels 202 and 202' are not of a constant thickness around the circumference of the annulus. However, under certain circumstances, such flow paths may be advantageous. It should also be recognized that numerous other geometric configurations of the pin can be provided if desired.

Figure 4D:
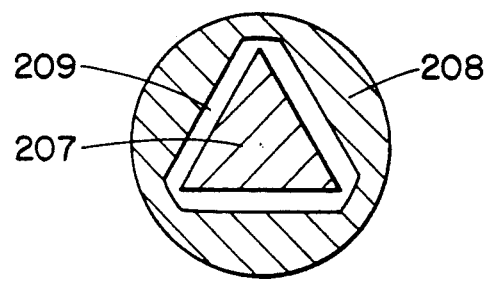
Figure 4C:
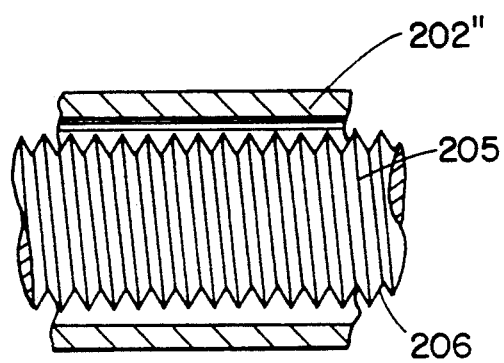

FIG. 4C illustrates a configuration in which the pin is not of a constant diameter along its length as are pins 200 and 204 in FIGS. 4A and 4B. In FIG. 4C, a pin 205 extends through a barrel 202''. The pin 205 has a spiraling groove 206 extending along its periphery such as would result from a suitable threading of the pin 205. Under certain circumstances, the provision of such a groove along the length of the pin may be advantageous in order to provide an annular flow path which, due to its varying thickness, will cause turbulent gas flow therethrough.

FIG. 4D illustrates a configuration in which a pin 207 has a substantially diamond-shaped or triangular cross-section. The pin 207 is disposed in a barrel 208 which has extending therethrough longitudinally an aperture that allows the pin 207 and barrel 208 to define between them a substantially constant diameter annular flow path 209 which is not circular in cross-section. In other words, unlike the barrels 202, 202' and 202'' of FIGS. 4A–4C, the barrel 208 does not have a substantially circular aperture extending longitudinally therethrough. Rather, a somewhat triangular aperture is provided in order to accommodate the triangular pin 207. Such an aperture is provided for the purpose of obtaining the substantially constant diameter annular flow path 209. The provision of a substantially constant diameter flow path presently appears to be advantageous. Based on present understanding, it is believed that the area of the flow path should be that provided by a bore having a diameter of approximately 50 to 90 thousandths of an inch (0.127 to 0.229 cm). As presently understood, the clearance between an outer diameter of the pin and the inner diameter of the barrel should be on the order of approximately 8 to 15 thousandths of an inch (0.020–0.038 cm).

It should also be recognized that while a flat tip 83 is disclosed in FIG. 2, other tip configurations can also be provided. With reference now to FIG. 5A, a pointed tip 210 can be provided on a pin 212 if desired. Alternatively, as illustrated in FIG. 5B, a recessed tip 214 can be provided on a pin 216 if that is desired.

With reference now also to FIG. 6, each of the previous embodiments illustrated a design in which an annular flow path whether of a constant diameter as shown in FIGS. 1–3 or of varying diameters as shown in FIGS. 4A–4D have been illustrated. However, it would also be conceivable to provide a pin which so cooperates with the barrel and/or bore as to provide several substantially discrete flow paths. As shown in FIG. 6, a barrel 220 encloses a pin 222 which has a cross-section shaped roughly on the order of a maltese cross so as to provide four discrete flow paths 230, 232, 234 and 236 between the inner periphery of the barrel 220 and the outer periphery of the pin 222. Therefore, rather than having a single annular flow path, in essence four discrete flow paths 230–236 are provided although some amount of gas can also flow through a space 240 defined between the outer periphery of the pin 222 and the inner periphery of the barrel 220.

In the previous embodiments, the diameter of the pin has always been substantially constant along the length of the pin. However, as shown in FIG. 7, it could also be envisioned that the tip of the pin can be in the shape of a truncated cone. More specifically, a barrel 250 can enclose a pin 252 which has a front section 254 that is shaped like a truncated cone and a rear section 256 which has the shape of a right cylinder. Such a pin configuration may be useful in certain environments.

In the previous embodiments, the pin has been of a unitary construction. However, as shown in FIG. 8 it could also be envisioned that the pin can be made from two discrete pieces. More specifically, a barrel 260 can enclose a pin 262 which comprises a tip element 264 that is threadedly received in a base member 266. For this purpose, the tip 264 can have a stem 266 which threadably engages in a suitably shaped threaded bore 268 provided in the base. This would allow for the replacement of the tip 264 with a differently shaped tip if that becomes necessary. It is also evident from the embodiment of FIG. 8 that the tip 264 has a different diameter than the pin base 266. While it is illustrated that the tip 264 has a larger diameter than the base 266, that relationship could also be reversed if that were found desirable. In order to steady the pin base 266, a suitable spider 270 can be located in a fluid flow passage 272 which is defined between the pin 262 and the barrel 260. The barrel 260 can also have a replaceable tip if that is thought useful so that the shape of the aperture in the barrel tip accommodates the shape of the pin tip.

In the embodiment of FIG. 3, the cross bar 60 is shown as having a blind bore into which the pin threaded end 84 is fastened. However, it is also conceivable to provide a threaded aperture which extends all the way through a cross bar as shown in FIG. 9. More specifically, a cross bar 280 is provided with a threaded aperture 282 into which extends a threaded end 284 of a suitable pin 286. As shown in the embodiment of FIG. 9, the pin can be provided with a shoulder 288 so as to cooperate with a suitable shoulder 289 provided at the front end of the aperture 282 to limit the threading of the pin 286 into the aperture 282. A suitable joint compound (not visible) can be provided for the interengaging threads 282 and 284 in order to prevent a gas leakage therethrough With reference now to FIG. 10, an alternative version of a means for securing a pin in a cross bar is there illustrated. More particularly, in this embodiment a cross bar 290 has a threaded aperture 292 in which is threaded a second end 294 of a suitable pin 296. In order to prevent any leaks through the pin a suitable braised joint or welded joint 298 can be provided on the far end of the pin as is illustrated. Of course it should be appreciated that many other gas leak preventing means could also be employed between the pin and the cross bar 290.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. An apparatus for injecting a viscous fluid and a non-viscous fluid into a mold cavity of a mold body, the apparatus comprising:

a nozzle body comprising an inlet end and a discharge end, and a flow passage for the viscous fluid extending from said inlet end to said discharge end; and, a valve element mounted for reciprocation in said nozzle body flow passage to control a flow of the viscous fluid through said nozzle body discharge end, said valve element comprising:

a barrel having a first end, selectively engaging a portion of the nozzle body discharge end to prevent a flow of the viscous fluid therepast and a second end, a bore extending longitudinally in said barrel, and a pin located in said barrel bore, said pin having a first end located adjacent said barrel first end such that said pin and said barrel define between them an annular opening at said barrel first end, said annular opening communicating with said barrel bore, said pin being operatively secured to said barrel such that said pin moves together with said barrel as said barrel reciprocates in said nozzle body.

2. The apparatus of claim 1 wherein said pin comprises a right cylinder having a substantially constant diameter.

3. The apparatus of claim 1 wherein said pin first end is flat.

4. The apparatus of claim 1 wherein said pin first end is even with said barrel first end.

5. The apparatus of claim 1 wherein a non-viscous fluid flow passage is defined between said pin and said barrel and said non-viscous fluid flow passage is annular in shape such that said flow passage surrounds said pin.

6. The apparatus of claim 5 wherein said annular flow passage is of a constant diameter.

7. The apparatus of claim 5 wherein said annular flow passage does not have a constant diameter.

8. The apparatus of claim 1 wherein a non-viscous fluid flow passage is defined between said pin and said barrel and said non-viscous fluid flow passage comprises several discrete flow paths extending between said pin and said barrel.

9. The apparatus of claim 1 wherein said pin comprises a base portion and a tip portion which can be selectively removed from said base portion.

10. The apparatus of claim 1 wherein said pin has a non-uniform diameter along its length.

11. The apparatus of claim 10 wherein said pin has a ribbed surface.

12. The apparatus of claim 1 wherein said barrel bore has a substantially constant diameter at and adjacent said barrel first end.

13. A nozzle for injecting a viscous fluid into a mold cavity of a mold body, said nozzle comprising:

a nozzle body positioned adjacent the mold body, said nozzle body comprising an inlet end, an opposite discharge end which communicates with said mold cavity and a flow passage for the viscous fluid extending from said inlet end to said discharge end;

a valve element mounted or reciprocation in said nozzle body flow passage to control a flow of the viscous fluid through said nozzle body discharge end wherein said valve element comprises a barrel having a first end, adapted to selectively engage a portion of a tip section of said nozzle body to prevent a flow of the viscous fluid therepast and wherein a bore extends longitudinally in said barrel;

a pin located in said longitudinally extending bore of said barrel, said pin and said barrel being secured to a reciprocating means so that said pin reciprocates with said barrel; and, an annular flow passage defined between said pin and said barrel, said flow passage allowing a flow of a non-viscous fluid through said barrel and into the mold cavity.

14. The nozzle of claim 13 wherein said pin comprises a right cylinder.

15. The nozzle of claim 14 wherein said annular flow passage is of a substantially constant diameter.

16. A nozzle for injecting a viscous fluid and a non-viscous fluid, comprising:

a nozzle body having an inlet end, a discharge end and a flow passage for the viscous fluid extending from said inlet end to said discharge end;

a shut off barrel disposed for reciprocating movement in said nozzle body flow passage to control a flow of the viscous fluid through said nozzle body discharge end;

a cross link bar oriented generally normal to a longitudinal axis of said barrel, said barrel being secured to said cross link bar;

a passage extending in said shut off barrel and terminating at a front end thereof;

a pin extending through said shut off barrel passage, said pin being fixedly mounted to said cross link bar so as to reciprocate when said shut off barrel reciprocates; and, a first flow passage defined between said pin and said barrel through which the non-viscous fluid selectively flows.

17. The nozzle of claim 16 wherein said shut off barrel comprises:

a base section; and, a tip section, said tip section being threadedly received on said base section, wherein a first portion of said passage of said barrel extends longitudinally through said tip section and communicates with a second portion of said passage which extends in said base section.

18. The nozzle of claim 16 further comprising a first spider element located in said shut off barrel passage for stabilizing said pin in said shut off barrel.

19. The nozzle of claim 16 further comprising a cylinder mechanism carried by said nozzle body and operatively connected to said cross link bar for reciprocating said cross link bar and hence said barrel in said nozzle body flow passage.

20. The nozzle of claim 16 further comprising a second flow passage extending through said cross link bar and communicating with said first flow passage.

* * * * *